United States Patent

[11] 3,586,058

| [72] | Inventors | Robert O. Ahrens<br>St. Louis;<br>Erwin K. Welhart, Florissant; William M. Jakway, Overland, all of, Mo. |
|---|---|---|
| [21] | Appl. No. | 762,508 |
| [22] | Filed | Sept. 25, 1968 |
| [45] | Patented | June 22, 1971 |
| [73] | Assignee | McDonnell Douglas Corporation<br>St. Louis, Mo. |

[54] HOLLOW BODIES AND METHOD OF FABRICATING THE SAME
10 Claims, 10 Drawing Figs.

[52] U.S. Cl. ................................................. 138/103,
 138/109, 139/141, 138/17
[51] Int. Cl. ..................................................... F16l 55/00
[50] Field of Search ............................................. 156/149;
 28/72; 138/103—109, 123—127, 109, 141, DIG.
 2, DIG. 7, DIG. 4, DIG. 11, 177; 87/1, 11, 13

[56] References Cited
UNITED STATES PATENTS

| 1,175,373 | 3/1916 | Noack | 138/109 |
| 2,614,058 | 10/1952 | Francis | 138/141 |
| 3,096,560 | 7/1963 | Liebig | 139/387 |
| 3,431,947 | 3/1969 | Hines | 138/109 |

*Primary Examiner*—Henry S. Jaudon
*Attorney*—Gravely, Lieder & Woodruff

ABSTRACT: A hollow body is formed by braiding roving over a mandrel and impregnating the roving with a resin either before or after it is braided. When the resin cures it forms a fluid-tight matrix in which the braided roving is imbedded.

PATENTED JUN 22 1971 3,586,058
SHEET 1 OF 2
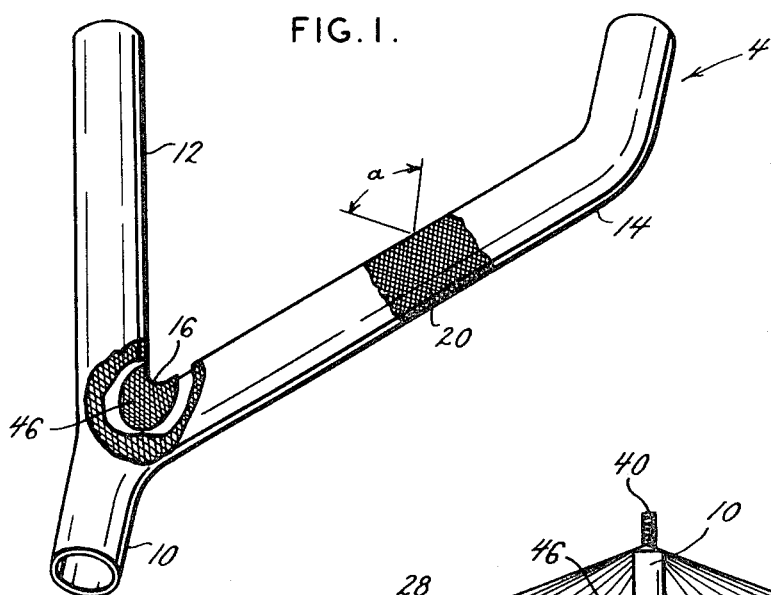
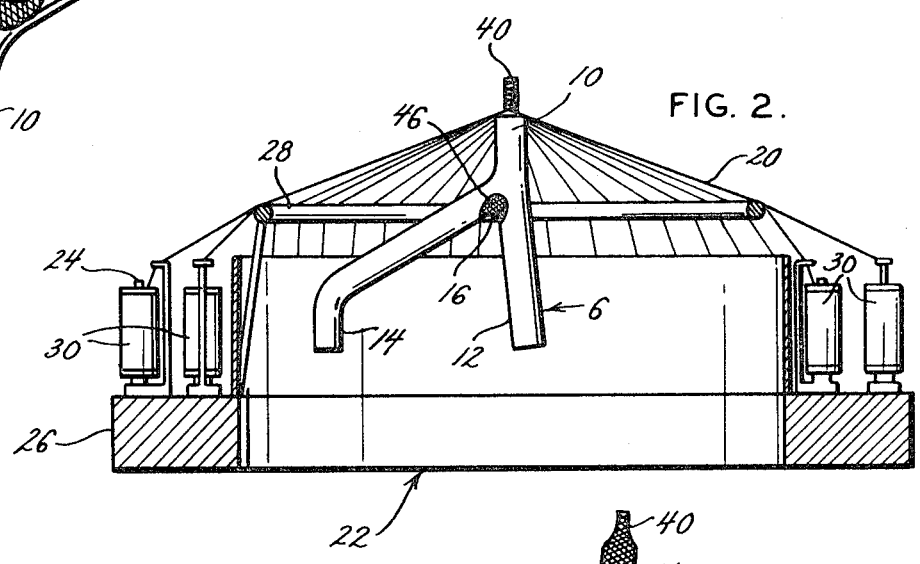
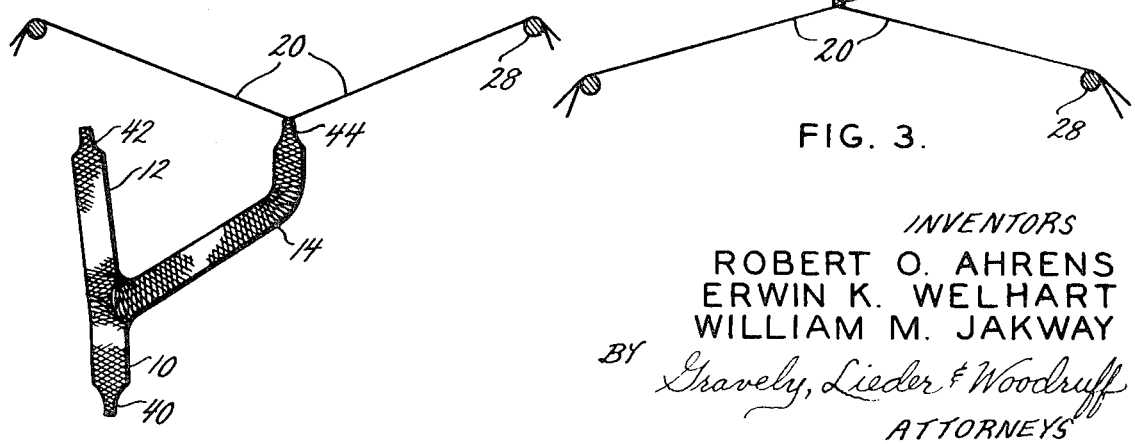
INVENTORS
ROBERT O. AHRENS
ERWIN K. WELHART
WILLIAM M. JAKWAY
BY *Gravely, Lieder & Woodruff*
ATTORNEYS

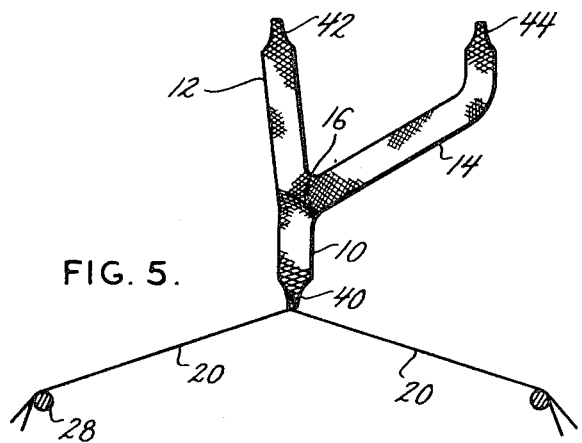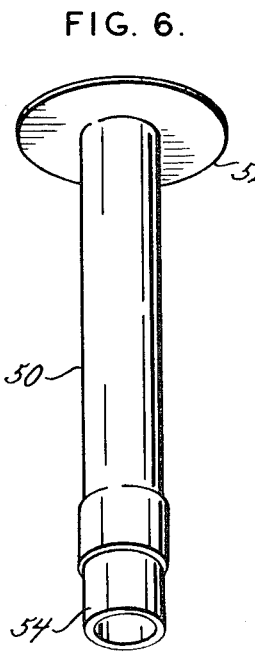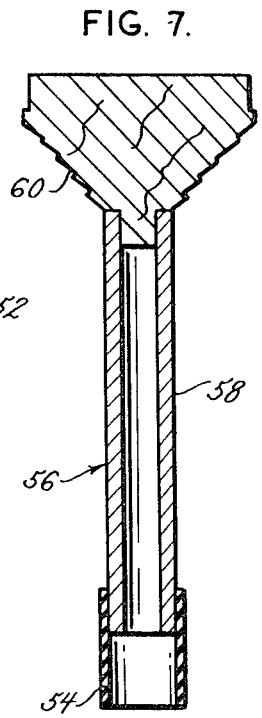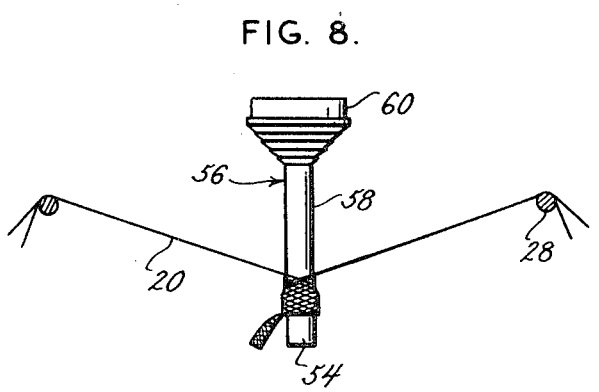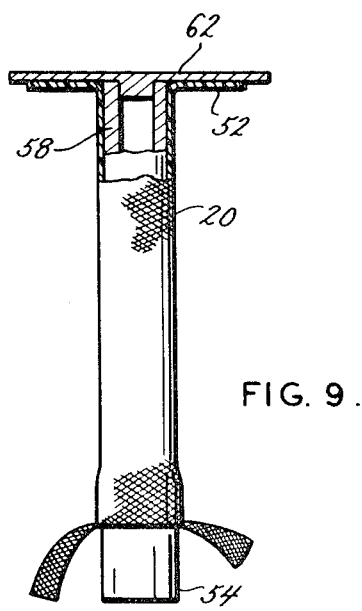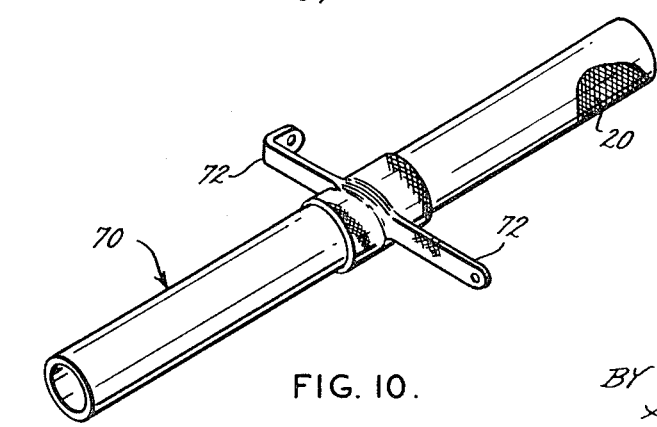

3,586,058

HOLLOW BODIES AND METHOD OF FABRICATING THE SAME

This invention relates in general to conduits or other hollow bodies and more particularly to conduits or hollow bodies from braided filaments and a method of fabricating the same.

High performance aircraft have extensive duct networks connecting the central air conditioning units and external air intakes to the cockpits of those aircraft, as well as to various electronic and optical equipment on board. These duct networks include many individual ducts having complex shapes and branch outlets as well as mounting ears and other specialized fittings. Inasmuch as high performance aircraft operate in environments of reduced pressure, the ducts must be capable of withstanding relatively high internal pressures. Moreover, much of the electrical circuitry in such aircraft is encased in electrical conduits of a similar construction.

Heretofore, it has been the practice to fabricate many of such ducts and electrical conduits from woven glass fabric by means of time consuming hand layup procedures which are practical for only simple duct or conduit configurations. In more complicated configurations, such as ducts of a serpentine shape or those having T or Y joints, branch outlets, changes in cross section or attachment ears, hand layup procedures require numerous splices, laps and joints which are not only difficult to form, but also create points of weakness within the duct itself. Often, numerous layers of fabric must be utilized to achieve sufficient strength at these joints, overlaps, and splices, and as a result, conventional ducts and electrical conduits are often quite bulky and heavy, considering the material from which they are constructed.

One of the principal objects of the present invention is to provide a fluid or electrical conduit which is capable of withstanding high temperatures and pressures and is suitable for use in aircraft. Another object is to provide a duct or conduit having superior burst strength and greater fatigue life than comparable ducts fabricated in accordance with conventional hand layup procedures. A further object is to provide a method of fabricating a duct or conduit of the type stated, which method is simple and does not require excessive time or a high degree of skill. Still another object is to provide a method of fabricating ducts and conduits having complex shapes and fittings, all as an integral unit.

These and other objects and advantages will become apparent hereinafter.

The present invention is embodied in a duct, electrical conduit, or other hollow body comprising at least one layer of braided roving imbedded in a resin matrix. The invention also includes the process for forming such a duct or conduit, and that process basically involves braiding the roving over a mandrel, impregnating the roving with a resin either before or after it is braided, curing the resin, and removing the mandrel.

The invention also consists in the parts and in the arrangements and combinations of parts hereinafter described and claimed. In the accompanying drawings which form part of the specification and wherein like numerals refer to like parts wherever they occur:

FIG. 1 is a perspective view of a cut constructed in accordance with and embodying the present invention;

FIG. 2 is a sectional view of a braiding machine showing the commencement of a braid on a mandrel;

FIGS. 3—5 are elevational views showing successive braiding steps on the mandrel shown in FIG. 2;

FIG. 6 is a perspective view of another duct forming part of the present invention;

FIG. 7 is a sectional view of the mandrel on which the duct of FIG. 6 is formed;

FIG. 8 is an elevational view showing a braid being formed on the mandrel of FIG. 7;

FIG. 9 is an elevational view, partially broken away and in section, of the mandrel of FIG. 7 having a braiding extending across its outer surface and its tapered head replaced by a flat plate; and FIG. 10 is a perspective view of still another duct forming part of the present invention.

Referring now to the drawings, 4 designates a fluid conduit or duct of complex shape which is initially formed on a mandrel 6 having an external configuration which conforms to the internal shape of the duct 4 itself. The mandrel 6 is preferably cast or otherwise formed from a material which can be dissolved, melted, broken away or otherwise removed from the interior of the duct 4 once the duct 4 has assumed its final shape and has set up in that configuration. After the mandrel 6 is cast, its outer surface is coated with a sealant impervious to the resin subsequently employed. A Y-shaped mandrel 6 (FIG. 2) and duct 4 (FIG. 1) have been illustrated inasmuch as they are typical of the complex duct shapes which can be fabricated in the instant process. The Y-shaped configuration commences at a common base or leg 10 which merges into a pair of diverging branches 12 and 14 which in turn forms a crotch 16 on the duct 4 or mandrel 6, whatever the case may be. While the following description will be devoted to ducts or fluid conduits primarily, it should be understood that it also applies to other types of encasing devices such as electrical conduits.

The duct 4 comprises a single or preferably two or more layers of braided roving 20 which can be any suitable filament material. The braided roving 20 is impregnated with a suitable resin which forms a rigidifying fluidtight matrix across the individual strands of roving 20. More particularly, the roving 20 is applied over the outer surface of the mandrel 6 by a conventional braiding machine 22 (FIG. 2) having a plurality of spindles 24 circumferentially arranged on an annular base 26 which is concentric about a raised center ring 28. Each spindle carries a spool or cop 30 of roving 20, with the individual strands or roving 20 extending upwardly and inwardly across the center ring 28 where they converge inwardly toward its center.

At the center of the ring 28 the individual strands of roving 20 are tied together, and when the machine 22 is energized a pigtail 40 will form at the juncture of the rovings 20 (FIG. 2). Of course, the pigtail 40 should be drawn axially upwardly or downwardly to prevent the roving 20 from accumulating on itself in a tangled mass. After the pigtail 40 is established, the circular end face of the leg 10 on the mandrel 6 is pressed against the converging rovings 20 at the end of the pigtail 40 most recently formed. The leg 10 is then urged axially in the direction in which the pigtail 40 was initially deflected from the plane of the ring 28, and this causes the machine 22 to braid the roving 20 over the outer surface of the leg 10. The mandrel 6 is advanced through the ring 28 at a uniform rate and with the axes of the ring 28 and leg 10 being coaxial until the diverging branches 12 and 14 are encountered, at which point the branch 14 is lifted through the plane of the ring 28 intermediate a pair of adjacent rovings 20 and the braiding is continued at the same uniform rate along the remaining branch 12 (FIG. 3). At the end of the branch 12 the roving 20 is braided off into another pigtail 42, whereupon the feed is reversed and the roving 20 is back braided across the first layer of braided roving 20 at the pigtail 42 and on the branch 12 of the mandrel 6. When the crotch 16 is encountered during this back braiding, the leg 10 is passed through the plane of the ring 28 intermediate two adjacent strands of roving 20 and the braiding is continued along the branch 14 (FIG. 4). Still another pigtail 44 is formed at the end of the branch 14, whereupon the roving 20 is back braided across that pigtail, and the first layers of braiding on the branch 14 and the leg 10, so that a double layer of braided roving extends across the entire surface area of the mandrel 6 (FIG. 5).

To rigidify and strengthen the duct 4 at the juncture of the branches 12 and 14 where the braid pattern spreads, a fabric diaper 46 may be placed in the crotch 16 of the mandrel 6 before the braiding operation commences. A small piece of double-backed adhesive tape may be used to hold the diaper 46 in place as the mandrel 6 is manipulated through the braiding machine 22. Similarly, diapers should be used with ducts having forks, side branches, sharp bends and other configurations which tend to open or spread the braid pattern.

The braid angle of the braided roving 20, that is, the angle $\alpha$ between crossed strands of roving 20 in the braid, is dependent on the angle the converging rovings 20 assume with the plane of the center ring 28, and this angle is, in turn, dependent on the force used to advance the mandrel 6 through the ring 28. Braid angles between 30° and 80° are acceptable for duct 4, while a braid angle of 45° is preferred. A skilled operator, by hand feeding the mandrel 6, can maintain the braid angle within 5° to 10° of the optimum angle selected for the braid merely by observing the angle between the rovings 20 and plane of the ring 28. With the exception of forks, side branches, sharp bends and other places where the braid pattern tends to open or spread, the braid pattern should be close enough to completely obscure whatever underlies it, whether that underlying layer be the mandrel 6 or another layer of braiding.

Once the braiding is completed, the mandrel and the braided roving 20 are immersed in a vessel containing a liquid resin. The vessel is, in turn, contained within a chamber sealed to the atmosphere so that the pressure of the air acting on the fluent resin may be both reduced and subsequently returned to atmospheric conditions to more thoroughly impregnate the braiding. The resin may be a polyester, epoxy, phenolic, polyimide, polyurethane, or any other suitable variety. Epoxy resins are superior insofar as mechanical properties are concerned. Moreover, they have lower permeability and by reason of this fact most mandrel materials need not be coated with a sealant to prevent the epoxy resin from permeating the mandrel 6.

After the braided mandrel 6 is immersed in the vessel, the chamber is sealed and its internal pressure is reduced below atmospheric conditions to exclude air from the roving 20 and liquid resin. Thereafter, the pressure within the chamber is returned to atmospheric pressure, causing the resin to thoroughly impregnate the braided roving 20.

Once the resin has completely impregnated the braided roving 20, the mandrel 6 is removed from the vessel and the excess resin is wiped off the outer surface of the braiding. Next, the impregnated braided roving 20 is wrapped with a heat-shrinkable tape, and the resin is cured at elevated temperatures. This heating causes the tape to contract and tightly embrace the impregnated braiding so as to consolidate the resin and form a smooth resin surface across the outer layer of braided roving 20. Next, the heat-shrinkable tape is removed and the mandrel is preferably postcured again at elevated temperatures, the length and temperature of the postcure being dependent on the temperature to which the duct 4 will be subjected in service as well as the characteristics of the particular resin employed. Where the duct 4 is used at low temperatures no postcure may be necessary. If the mandrel 6 is formed from a material which is to be melted away, the temperature of the postcure should be high enough to melt the mandrel 6. On the other hand, if the mandrel 6 is formed from a material which may be removed through the use of a solvent or by a mechanical process, the mandrel 6 should be eliminated prior to the postcure.

While the duct 4 is highly impervious after the resin cures, leakage may be decreased even further by applying a sealer to its outer surface.

Referring now to FIGS. 6—9, a duct 50 having an enlarged flange 52 at one end and an elastomeric cuff 54 at its opposite end may be formed by substantially the same process. More particularly, the duct 50 is formed on a mandrel 56 (FIG. 7) having a shank 58 fitted with a removable tapered head 60 at its one end. The shank is preferably cast from a material which can be melted or selectively dissolved away, while the head 60 is formed from any easily workable material such as wood and its tapered surface is composed of a plurality of progressively wider steps. The elastomeric cuff 54 is fitted over the opposite end of the shank 58 and a circumferential band of adhesive is spread across the outer surface of the inner portion of the cuff 54.

After establishing a pigtail on the braiding machine 22, the cuff 54 on the mandrel 56 is inserted against the converging strands of roving 20, and the shank is then turned to a position where its axis is generally coaxial with the axis of the ring 28, causing a braid to form over the adhesive on the cuff 54 (FIG. 8). The shank portion 58 is advanced through the ring so that the roving 20 braids across the outer surface of the shank portion 58 and onto the tapered surface of the head 60. The steps on the head 60 prevent the roving from slipping off the head 60 and back onto the previous rows of roving formed on the shank 58. Once the end of the head 60 is reached, the feed is reversed, and the roving 20 is back braided across the previously established layer of braiding. Two or more layers of braiding may be formed on the mandrel 56 in this manner. Thereafter, the layers of braiding on the head 60 are peeled away from the tapered surface and the head 60 is removed from the end of the shank 58 and replaced with a flat circular plate 62 against which the rearwardly peeled braided roving 20 bears in the formation of a flange by virtue of its own natural resiliency (FIG. 9). Next, the open end of the cuff 54 is plugged and masked, and the mandrel and braiding are immersed in a resin and cured in the manner previously described.

The end product is the duct 50 having an enlarged braided flange 52 integrally formed at one end and the rubber cuff 54 at its opposite end, both of which are used for connecting purposes. The cuff 54 is firmly retained in the duct 50 even at elevated pressure, since such pressures expand the cuff 54 outwardly into even tighter engagement with the embracing layers of braided roving 20.

As will be seen by reference to FIG. 10, ducts 70 having attachment ears 72 may be formed by the same process. In such a case, several layers of roving 20 are first braided over a mandrel 74 in the manner previously described and during the final pass a pair of pigtails are braided into the midportion of the outer layer of duct braiding. The braided mandrel 74 is then immersed in resin and once withdrawn therefrom the impregnated pigtails are shaped into the configuration desired for the ears 72. Thereafter, the resin is cured as previously described.

By using a roving preimpregnated with a suitable resin, the need for a vessel of liquid resin is eliminated. Best results are obtained when the roving is impregnated with a B-stage resin, that is, with a resin cured to the gel stage. Accordingly, after the mandrel is braided with the preimpregnated roving, the braiding is wrapped with a heat-shrinkable tape. The wrapped and braided mandrel is then subjected to elevated temperatures to both fully cure the resin and to cause the resin material on individual rovings to bond together and form a fluidtight duct wall. It is desirable to coat the outer surface of the resin with a suitable sealer after the final cure.

While mandrels which can be melted, dissolved or broken away from the inner layer of braided roving 20 are desirable for complex duct configurations such as duct 4, some duct configurations such as the straight duct 70 can be formed on permanent mandrels. Aluminum has proved to be an excellent material for such mandrels.

The following examples illustrate the invention:

EXAMPLE 1

A mandrel 6 cast from Paraplast 36 distributed by Rezolin, Inc. of Santa Monica, Calif. was sealed with a 2mil coating of Rezolin 832A mold sealer. Thereafter, a single-ply style 181 glass fiber diaper 46 was fitted into the crotch 16 and E–888G, 13 end, continuous glass fiber roving distributed by the Owens-Corning Fiberglas Corporation was braided over the mandrel 6 in the manner previously described. The braided mandrel 6 was subsequently immersed in Vibrin 135 polyester resin catalyzed with 4 percent by weight of benzoyl peroxide paste. This resin is distributed by the Naugatuck Chemical Company of Naugatuck, Conn., and has an extremely long pot life in excess of several weeks when maintained at 70° F. The resin containing vessel was sealed in a chamber closed to the atmosphere and the pressure in that chamber was first reduced below atmospheric pressure to 0.4 inches of Hg and then returned to atmospheric pressure. The braided mandrel 6 was retained in the resin vat for 30—45 minutes so that the resin thoroughly impregnated the glass roving 20. The mandrel 6 with the impregnated roving 20 was then removed from the vessel, and the excess resin was wiped off the braiding. Next, Tedlar shrink tape manufactured by E. I. du Pont de Nemours was wrapped around the braided roving 20 on the mandrel 6 and the mandrel 6, braiding and resin were heated to 190° F. over a period of 15 minutes and maintained at that temperature for an additional 30 minutes, for the purpose of shrinking the Tedlar tape and curing the polyester resin. After the 30-minute period, the cure was continued for another 2 hours at 250° F. The resin was then allowed to cool and the tape was removed, exposing the smooth resin surface over the outer layer of braided roving 20. Thereafter, the resin was postcured by heating the impregnated braiding on the mandrel 6 from ambient temperature to 390° F. over a period of 60 minutes and then maintaining that temperature for an additional 2 hours. Inasmuch as Paraplast 36 melts at 390° F., the mandrel 6 was converted to a liquid state and flowed out of the impregnated braiding, leaving the duct 4. Finally, to still further retard leakage, the resin was sanded, primed, and sealed with RTV-108 Silicone Sealer distributed by the Silicone Products Division of General Electric Company at Waterford, N.Y.

EXAMPLE 2

The mandrel 6 was provided with a multilayer braiding reinforced by a diaper 46 in the crotch area 16, all as described in Example 1. The Paraplast mandrel, however, was not coated with a sealant. The braided mandrel 6 was then immersed in Epon 828 epoxy resin marketed by the Shell Chemical Company of Chicago, Ill., and that resin was catalyzed by 70 parts of Methyl Nadic Anhydride (MNA) Curing Agent and 2.5 parts of Dimethyl-Amino-Methyl-Phenol (DMP-10) Accelerator for each 100 parts by weight of epoxy resin. The MNA may be obtained from the Allied Chemical Company, New York City, N.Y., while DMP-10 is available from Rohm and Haas of Philadelphia, Pa. After subjecting the resin to reduced pressure as described in Example 1 to achieve greater impregnation, the impregnated braided mandrel 6 was removed from the resin vat, and the resin was cured at 250° F. for 2 hours and then at 350° F. for 3 hours. The mandrel 6 was then dissolved in water maintained at not over 160° F. No postcure is required where the duct 4 so formed is consigned for service in an environment which will not exceed 250° F. By postcuring at 400° F. for an additional 3 hours, the ducts 4 so formed can be used in temperatures up to 325° F. When the temperature of the postcure is elevated to 500° F. and maintained at that temperature for 3 hours, the ducts 4 so cured can withstand temperatures up to 400° F. in service. The cured duct was sealed with RTV-108 Silicone Sealant.

EXAMPLE 3

A mandrel shank 58 cast from Paraplast 36 was fitted with a step-tapered wooden head 60 and a rubber cuff 54, thereby forming a mandrel 56. A circumferential band of DC-140 adhesive, distributed by Dow Corning Corp. Midland, Mich., was applied to the surface of the cuff 54, and the end of the cuff 54 was capped. Glass fiber roving 20 was braided over the outer surface of the cuff 54, shank 58, and head 60 and back braided, and the braided mandrel 56 was immersed in a vessel of catalyzed Vibrin 135 polyester resin. The vessel was then sealed to the atmosphere and evacuated to a pressure of 0.4 inches of mercury. After 30 to 45 minutes, the pressure within the vessel was raised to atmospheric pressure and maintained at that level for 5 minutes. The impregnated braiding was then wrapped with Tedlar shrink tape and cured as described in Example 1.

EXAMPLE 4

A mandrel 6 formed from Paraplast 36 and coated with Rezolin 832A mold release was braided according to the technique previously described with E-787, epoxy impregnated, 20 end, E-glass, roving. The resin of this roving is B-stage, and the roving itself is available from U.S. Polymeric, Inc., Santa Ana, Calif. The braided mandrel 6 was then wrapped with Tedlar shrink tape, and the resin material on the roving 20 was cured at 250° F. for 2 hours and at 375° F. for an additional 3 hours.

Ducts constructed in accordance with the present invention, irrespective of their configuration, include a continuous braid. As a result, no splice or overlaps exist to from points of weakness at which ruptures are most likely to occur. Moreover, the continuous braid contributes to a generally uniform wall thickness and lighter weight. When ducts constructed in accordance with the present invention are subjected to elevated internal pressures, the resin matrix transfers the load across the individual strands of roving 20 in the braid and eliminates areas of stress concentration.

In tests the average burst strength of ducts constructed in accordance with the foregoing processes was 20 percent higher than comparable ducts constructed by conventional hand layup procedures. The average fatigue life of ducts fabricated in accordance with the processes of the present invention was over 10 times that of conventional hand layup ducts. Finally, the present process does not demand highly skilled labor and is considerably faster than conventional hand layup procedures, requiring only 40 percent of the time to complete a comparable duct. Using preimpregnated roving requires even less time.

Hereafter, the term conduit will be used to refer to fluid conduits or ducts as well as to other types of encasing conduits such as electrical conduits.

This invention is intended to cover all changes and modifications of the examples of the invention herein chosen for purposes of the disclosure which do not constitute departures from the spirit and scope of the invention.

What we claim is:

1. A conduit comprising a first layer of roving braided into a tubular configuration and extending substantially the entire length of the conduit, a second layer of braided roving braided directly over the first layer and also extending substantially the entire length of the conduit, the smallest angle between the individual strands of roving in each layer of braiding being between about 30° and about 80°, and a fluidtight resin matrix in which each layer of roving is embedded, the resin of the matrix being closely consolidated about the roving of each layer of braiding and being cured so to form a tubular wall possessing substantial strength.

2. A conduit according to claim 1 wherein the tubular wall includes at least two intersecting branches, and wherein the braiding is continuous across the branches.

3. A conduit according to claim 1 and further characterized by a flange formed from braided roving impregnated with resin, the roving of the flange being braided integral with the roving of the tubular wall.

4. A conduit according to claim 3 wherein the second layer of braided roving at the flange is formed by back braiding across the first layer of braided roving so that the roving of two layers are joined at the periphery of the flange.

5. A conduit comprising a tubular wall having at least two intersecting branches which form a crotch and being formed from at least two layers of braided roving embedded in a substantially fluidtight resin matrix, the braiding of the roving being continuous across the branches, and a flexible diaper embedded in the resin matrix at the crotch.

6. A conduit comprising a tubular wall formed from at least one layer of braided roving embedded in a substantially fluidtight resin matrix, and at least one attachment ear braided outwardly from the braided roving of the tubular wall and impregnated with the resin.

7. A conduit comprising a tubular wall formed from at least one layer of braided roving embedded in a substantially fluid-tight resin matrix, and an elastomeric cuff at least one end of the tubular wall, a portion of the resin impregnated braided roving embracing the cuff so that when the conduit is subjected to elevated internal pressures the cuff will expand into tighter engagement with the braided roving.

8. A hollow body having a wall structure comprising an inner layer of initially flexible material formed into a configuration which closes upon itself and is free of longitudinal seams; at least one additional layer of initially flexible material which also closes upon itself and is free of longitudinal seams, the second layer extending over and obscuring the inner layer and being at least as long as the inner layer; each layer comprising multiple strands which are initially flexible and are braided together so that the strands in each individual layer cross in a braided pattern; and a fluidtight resin matrix in which the layers are embedded, the resin matrix being closely consolidated about the strands of the layers, the resin of the matrix being initially fluent so that it thoroughly impregnates the braided layers and being subsequently cured so as to rigidify the strands and braided layers and secure them together.

9. A hollow body according to claim 8 wherein the smallest angle between the individual strands in each braided layer is between about 30° and about 80°.

10. A hollow body according to claim 8 wherein each layer outwardly from the inner layer is formed by back braiding the strands across the previous layer.